US012586843B2

(12) United States Patent
Liao et al.

(10) Patent No.: US 12,586,843 B2
(45) Date of Patent: Mar. 24, 2026

(54) THERMAL MANAGEMENT COMPONENT, THERMAL MANAGEMENT SYSTEM, BATTERY, AND ELECTRIC APPARATUS

(71) Applicant: CONTEMPORARY AMPEREX TECHNOLOGY (HONG KONG) LIMITED, Hong Kong (CN)

(72) Inventors: Boxiang Liao, Ningde (CN); Feiting Song, Ningde (CN); Yuepan Hou, Ningde (CN); Xiaoteng Huang, Ningde (CN); Zhiming Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/979,384

(22) Filed: Dec. 12, 2024

(65) Prior Publication Data

US 2025/0112296 A1     Apr. 3, 2025

Related U.S. Application Data

(63) Continuation of application No. PCT/CN2022/098447, filed on Jun. 13, 2022.

(51) Int. Cl.
*H01M 10/6568* (2014.01)
*H01M 10/613* (2014.01)
(Continued)

(52) U.S. Cl.
CPC ..... *H01M 10/6568* (2015.04); *H01M 10/613* (2015.04); *H01M 10/625* (2015.04);
(Continued)

(58) Field of Classification Search
CPC ............. H01M 10/613; H01M 10/647; H01M 10/6568; H01M 50/209; F28D 1/05358
See application file for complete search history.

(56) References Cited

U.S. PATENT DOCUMENTS 7,045,236 B1     5/2006  Andrew et al.
7,851,080 B2 *  12/2010  Weber ................. H01M 10/651
                                                    429/514
(Continued)

FOREIGN PATENT DOCUMENTS

CN          206370478 U     8/2017
CN          108448205 A     8/2018
(Continued)

OTHER PUBLICATIONS

The World Intellectual Property Organization (WIPO) International Search Report and Written Opinion for PCT/CN2022/098447 Jan. 3, 2023 13 Pages (including translation).
(Continued)

*Primary Examiner* — Jonathan G Jelsma
(74) *Attorney, Agent, or Firm* — ANOVA LAW GROUP, PLLC

(57)          ABSTRACT

A thermal management component is provided with a medium inlet, a medium outlet, and a medium flow channel. The medium flow channel is located inside the thermal management component, the medium flow channel communicates with the medium inlet and the medium outlet, and the medium flow channel is used to accommodate a fluid medium to regulate temperature of the battery. The thermal management component is internally provided with a cavity disconnected from both the medium inlet and the medium outlet.

18 Claims, 8 Drawing Sheets

(51) Int. Cl.
   *H01M 10/625*      (2014.01)
   *H01M 10/647*      (2014.01)
   *H01M 50/209*     (2021.01)
   *B60L 50/64*      (2019.01)

(52) U.S. Cl.
   CPC ....... *H01M 10/647* (2015.04); *H01M 50/209*
       (2021.01); *B60L 50/64* (2019.02); *H01M*
                *2220/20* (2013.01)

(56)          References Cited

U.S. PATENT DOCUMENTS

| | | | |
|---|---|---|---|
| 2008/0308264 A1 | 12/2008 | Antonijevic | |
| 2011/0132580 A1 | 6/2011 | Herrmann et al. | |
| 2015/0207189 A1 | 7/2015 | Lee et al. | |
| 2018/0123192 A1* | 5/2018 | Fees ...................... | H01M 50/24 |

FOREIGN PATENT DOCUMENTS

| | | | | | |
|---|---|---|---|---|---|
| CN | 207938738 U | | 10/2018 | | |
| CN | 208674208 U | | 3/2019 | | |
| CN | 109713178 A | | 5/2019 | | |
| CN | 109962319 A | * | 7/2019 | | |
| CN | 110010995 A | | 7/2019 | | |
| CN | 209282249 U | | 8/2019 | | |
| CN | 110915061 A | * | 3/2020 | .......... | H01M 10/613 |
| CN | 211017317 U | | 7/2020 | | |
| CN | 211789374 U | * | 10/2020 | | |
| CN | 212277304 U | | 1/2021 | | |
| CN | 212485434 U | | 2/2021 | | |
| CN | 213459871 U | | 6/2021 | | |
| CN | 214378603 U | | 10/2021 | | |
| CN | 214957123 U | | 11/2021 | | |
| CN | 113797462 A | | 12/2021 | | |
| CN | 215119024 U | | 12/2021 | | |
| CN | 114497826 A | * | 5/2022 | | |
| JP | 201196536 A | | 5/2011 | | |
| JP | 2013055056 A | | 3/2013 | | |
| JP | 202196997 A | | 6/2021 | | |
| JP | 2021140965 A | | 9/2021 | | |
| KR | 20130132459 A | | 12/2013 | | |
| KR | 20180083140 A | | 7/2018 | | |
| KR | 20200051833 A | | 5/2020 | | |
| KR | 20210027862 A | | 3/2021 | | |
| KR | 20220016183 A | | 2/2022 | | |
| WO | 2019039116 A1 | | 2/2019 | | |

OTHER PUBLICATIONS

The State Intellectual Property Office of People's Republic of China Notice of Grant for Application No. 202223599568.9 Mar. 27, 2023 2 Pages (including translation).

The Japan Patent Office (JPO) Notice of Reasons for Rejection for Application No. 2024-572696 Jun. 24, 2025 10 Pages (including translation).

The European Patent Office (EPO) Communication pursuant to Rules70(2) and 70a(2) EPC for Application No. 22946108.2 Jul. 24, 2025 8 Pages.

The Korean Intellectual Property Office Notice of Submission of Opinion for Application No. 10-2025-7001051 Sep. 23, 2025 16 Pages (including translation).

Japan Patent Office (JPO) The Decision of Refusal For JP Application No. 2024-572696 Dec. 9, 2025 4 Pages (Translation Included ).

Korean Intellectual Property Office (KIPO) The Decision to Grant a Patent For KR Application No. 10-2025-7001051 Feb. 6, 2026 4 Pages (Translation Included ).

* cited by examiner

100

31

315

THERMAL MANAGEMENT COMPONENT, THERMAL MANAGEMENT SYSTEM, BATTERY, AND ELECTRIC APPARATUS

CROSS-REFERENCE TO RELATED APPLICATION

This application is a continuation of International Application No. PCT/CN2022/098447, filed on Jun. 13, 2022, the entire content of which is incorporated herein by reference.

TECHNICAL FIELD

This application relates to the field of battery technologies, and specifically to, a thermal management component, a thermal management system, a battery, and an electric apparatus.

BACKGROUND

In recent years, there has been a leap in the development of new energy vehicles. In the field of electric vehicles, traction batteries serve as an irreplaceable and crucial power source. A battery consists of a box and a plurality of battery cells accommodated in the box. As a core component of new energy vehicles, batteries have high requirements in terms of both safety and service life. However, during the continuous charging and discharging process, the battery cells inside the battery generate a large amount of heat, causing the internal temperature of the battery to rise sharply. This severely affects the use performance and service life of the battery, and even leads to significant safety risks during use of the battery, which is detrimental to consumer safety.

SUMMARY

Embodiments of this application provide a thermal management component, a thermal management system, a battery, and an electric apparatus, so as to effectively improve the use performance of the battery.

According to a first aspect, an embodiment of this application provides a thermal management component for a battery. The thermal management component is provided with a medium inlet, a medium outlet, and a medium flow channel, where the medium flow channel is located inside the thermal management component, the medium flow channel communicates with the medium inlet and the medium outlet, and the medium flow channel is used to accommodate a fluid medium to regulate temperature of the battery; and the thermal management component is internally provided with a cavity disconnected from both the medium inlet and the medium outlet.

In the above technical solution, the thermal management component is provided with the medium inlet, the medium outlet, the cavity, and the medium flow channel, and the medium flow channel communicates with both the medium inlet and the medium outlet and thus can accommodate the fluid medium to regulate the temperature of the battery, which can alleviate the phenomenon of sharp temperature rise inside the battery. The cavity is disconnected from both the medium inlet and the medium outlet, preventing the fluid medium from entering the cavity. This not only regulates the temperature of the battery but also reduces the weight of the thermal management component, achieving light weight of the thermal management component. In addition, during use, this can alleviate an increase in the weight of the thermal management component caused by the fluid medium entering the cavity, thereby effectively reducing the weight of the battery with such thermal management component, helping to increase the energy density of the battery, and improving the use performance of the battery.

In some embodiments, the thermal management component includes a body portion, a first fluid collecting member, and a second fluid collecting member. The body portion is provided with the medium flow channel and the cavity. In a length direction of the body portion, the first fluid collecting member and the second fluid collecting member are respectively disposed at two ends of the body portion, and the medium inlet and the medium outlet are respectively provided on the first fluid collecting member and the second fluid collecting member.

In the above technical solution, the thermal management component is provided with the body portion and the first fluid collecting member and second fluid collecting member connected to the two ends of the body portion in the length direction of the body portion. The body portion is provided with the medium flow channel and the cavity, and the medium inlet and the medium outlet are respectively provided on the first fluid collecting member and the second fluid collecting member, so that two ends of the medium flow channel communicate with the medium inlet and the medium outlet respectively, and the cavity does not communicate with the medium inlet and the medium outlet, achieving light weight of the thermal management component. Such thermal management component is simple in structure and easy to manufacture.

In some embodiments, the body portion is internally provided with a passage, and the passage runs through the two ends of the body portion in the length direction of the body portion. The thermal management component further includes a sealing member, where the sealing member is connected to the body portion, and the sealing member seals two ends of the passage to form the cavity.

In the above technical solution, the passage running through the two ends of the body portion in the length direction of the body portion is formed in the body portion of the thermal management component, and the sealing member is disposed on the body portion so that the sealing member seals the two ends of the passage to form the cavity disconnected from both the medium inlet and the medium outlet. This structure is simple and easy to manufacture and process, and different passages can be sealed according to actual needs, expanding the application range of the thermal management component.

In some embodiments, the sealing member is detachably connected to the body portion.

In the above technical solution, the sealing member is detachably connected to the body portion, allowing for quick removal and replacement of the sealing member. This facilitates sealing of the different passages according to actual needs during use, meeting various use requirements. In addition, this allows for maintenance and replacement of the sealing member, helping to prolong the service life of the thermal management component.

In some embodiments, a first chamber communicating with the medium inlet is formed in the first fluid collecting member, and a second chamber communicating with the medium outlet is formed in the second fluid collecting member. The medium flow channel runs through the two ends of the body portion in the length direction of the body portion to communicate with the first chamber and the second chamber.

In the above technical solution, the first fluid collecting member is provided with the first chamber communicating with the medium inlet, and the second fluid collecting member is provided with the second chamber communicating with the medium outlet. This allows the medium flow channel to communicate with both the first chamber and the second chamber after running through the two ends of the body portion, achieving communication between the medium flow channel and both the medium inlet and the medium outlet. This allows for simultaneous injection of the fluid medium into a plurality of medium flow channels through the medium inlet and the medium outlet during use, improving the use efficiency.

In some embodiments, the cavity and the medium flow channel both extend along the length direction of the body portion and are arranged along a width direction of the body portion.

In the above technical solution, the cavity and the medium flow channel both extend along the length direction of the body portion and are arranged along the width direction of the body portion. This facilitates the processing and manufacturing of the cavity and the medium flow channel and facilitates the optimization of the arrangement position of the medium flow channel, thereby helping to improve the capability of the thermal management component in regulating the temperature of the battery.

In some embodiments, in the width direction of the body portion, the medium flow channel is provided at a middle position of the body portion.

In the above technical solution, the medium flow channel is provided at the middle position of the body portion in the width direction of the body portion, allowing for heat exchange in positions where the internal heat of the battery is more concentrated, thereby helping to improve the thermal management performance of the thermal management component for the battery.

In some embodiments, the thermal management component is provided with a plurality of medium flow channels and a plurality of cavities, and along the width direction of the body portion, the cavities and the medium flow channels are arranged alternately.

In the above technical solution, the cavities and the medium flow channels are arranged alternately along the width direction of the body portion, meaning that there are a plurality of cavities and a plurality of medium flow channels, and the cavities and the medium flow channels are arranged alternately. This achieves a dispersed arrangement of the medium flow channels along the width direction of the body portion, effectively reducing the phenomenon of unbalanced heat exchange capacity of the thermal management component caused by concentrated medium flow channels, thereby improving the use performance of the thermal management component.

In some embodiments, in a thickness direction of the body portion, the body portion has two opposite side surfaces, area of one of the side surfaces is denoted as $S_1$, and total area of projections of the medium flow channels on the side surface is denoted as $S_2$, satisfying $S_2/S_1 \geq 0.2$.

In the above technical solution, the area occupied by the medium flow channels on the side surface of the body portion is greater than or equal to 20%, reducing the phenomenon of low heat exchange capacity caused by an excessively small area occupied by the medium flow channels, thereby ensuring the heat exchange performance of the thermal management component.

According to a second aspect, an embodiment of this application further provides a thermal management system including a plurality of the above thermal management components.

In the above technical solution, the thermal management system is provided with the plurality of thermal management components, helping to improve the thermal management capability of the thermal management system for a battery in the battery with such thermal management system, thereby reducing the safety risks caused by internal temperature rise of the battery.

In some embodiments, a medium outlet of one thermal management component communicates with a medium inlet of another thermal management component.

In the above technical solution, in the plurality of thermal management components, the medium outlet of one thermal management component communicates with the medium inlet of another thermal management component, achieving a series connection structure of the plurality of thermal management components, thereby facilitating assembly and processing, and allowing for injection of the fluid medium into the medium flow channels of the plurality of thermal management components during use.

In some embodiments, the thermal management component is provided with a plurality of medium flow channels, and along a flow direction of the fluid medium in the medium flow channels of the plurality of thermal management components, in two adjacent ones of the thermal management components, the number of the medium flow channels in a downstream thermal management component is greater than the number of the medium flow channels in an upstream thermal management component.

In the above technical solution, along the flow direction of the fluid medium, the number of the medium flow channels in the downstream thermal management component is greater than the number of the medium flow channels in the upstream thermal management component, helping to improve the heat exchange capacity of the downstream thermal management component, and ensuring balanced heat exchange capacities of the plurality of thermal management components of the thermal management system, thereby improving the overall thermal management capability of the thermal management system, and effectively alleviating the phenomenon of local temperature rise inside the battery.

In some embodiments, the medium inlets of the plurality of thermal management components communicate with each other, and the medium outlets of the plurality of thermal management components communicate with each other.

In the above technical solution, the medium inlets of the plurality of thermal management components communicate with each other, and the medium outlets of the plurality of thermal management components communicate with each other, achieving a parallel connection structure of the plurality of thermal management components. This allows for simultaneous injection of the fluid medium into the medium flow channels of the plurality of thermal management components. In addition, this can ensure balanced heat exchange capacity of each thermal management component, thereby effectively alleviating the phenomenon of local temperature rise inside the battery.

According to a third aspect, an embodiment of this application further provides a battery including a box, a plurality of battery cells, and the above thermal management system. The plurality of battery cells are accommodated in the box; and the thermal management system is disposed in the box, and the thermal management system is used to regulate temperature of the plurality of battery cells.

In some embodiments, the battery cell has a first side surface, the first side surface is a surface with the largest area of outer surfaces of the battery cell, and the first side surface abuts against the thermal management component.

In the above technical solution, the thermal management component of the thermal management system abuts against the first side surface of the battery cell, meaning that the thermal management component of the thermal management system is disposed on a side with the largest surface area of the battery cell, ensuring sufficient heat exchange area between the battery cell and the thermal management component, and helping to improve the thermal management capability of the thermal management component for the battery cell, thereby effectively reducing the safety risks caused by temperature rise during the use of the battery.

According to a fourth aspect, an embodiment of this application further provides an electric apparatus including the foregoing battery, where the battery is configured to supply electrical energy.

BRIEF DESCRIPTION OF DRAWINGS

To describe the technical solutions in embodiments of this application more clearly, the following briefly describes the accompanying drawings required for describing some embodiments. It is appreciated that the accompanying drawings below show merely some embodiments of this application and thus should not be considered as limitations on the scope. Persons of ordinary skill in the art may still derive other related drawings from the accompanying drawings without creative efforts.

Figure 1:
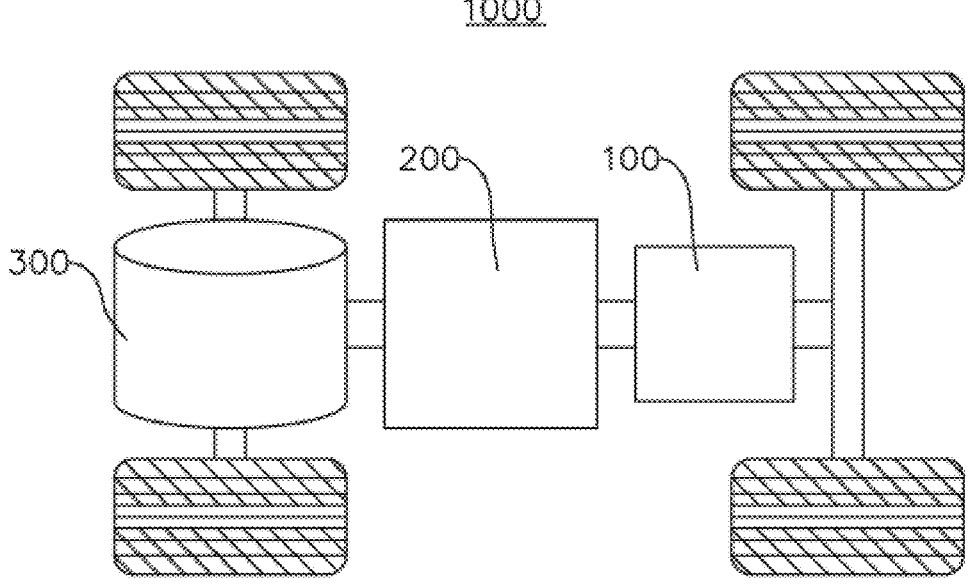
FIG. 1 is a schematic structural diagram of a vehicle according to some embodiments of this application.

Reference signs: 1000. vehicle; 100. battery; 10. box; 11. first box body; 12. second box body; 20. battery cell; 21. first side surface; 30. thermal management system; 31. thermal management component; 311. medium inlet; 312. medium outlet; 313. medium flow channel; 314. cavity; 315. body portion; 3151. passage; 3152. side surface; 316. first fluid collecting member; 317. second fluid collecting member; 318. sealing member; 200. controller; 300. motor; X. length direction of body portion; Y width direction of body portion; and Z. thickness direction of body portion.

DESCRIPTION OF EMBODIMENTS

To make the objectives, technical solutions, and advantages of the embodiments of this application clearer, the following clearly describes the technical solutions in the embodiments of this application with reference to the accompanying drawings in the embodiments of this application. Apparently, the described embodiments are some but not all of the embodiments of this application. All other embodiments obtained by persons of ordinary skill in the art based on the embodiments of this application without creative efforts shall fall within the protection scope of this application.

Unless otherwise defined, all technical and scientific terms used in this application shall have the same meanings as commonly understood by persons skilled in the art to which this application relates. The terms used in the specification of this application are intended to merely describe the specific embodiments rather than to limit this application. The terms "include", "comprise", and any variations thereof in the specification, claims, and brief description of drawings of this application are intended to cover non-exclusive inclusions. In the specification, claims, or accompanying drawings of this application, the terms "first", "second", and the like are intended to distinguish between different objects rather than to describe a particular order or a primary-secondary relationship.

Reference to "embodiment" in this application means that specific features, structures, or characteristics described with reference to the embodiment may be included in at least one embodiment of this application. The word "embodiment" appearing in various places in this specification does not necessarily refer to the same embodiment or an independent or alternative embodiment that is exclusive of other embodiments.

In the description of this application, it should be noted that unless otherwise specified and defined explicitly, the terms "mounting", "connection", "join", and "attachment" should be understood in their general senses. For example, they may refer to a fixed connection, a detachable connection, or an integral connection, and may refer to a direct connection, an indirect connection via an intermediate medium, or an internal communication between two elements. Persons of ordinary skill in the art can understand specific meanings of these terms in this application as appropriate to specific situations.

The term "and/or" in this application is only an associative relationship for describing associated objects, indicating that three relationships may be present. For example, A and/or B may indicate the following three cases: presence of only A; presence of both A and B; and presence of only B. In addition, the character "/" in this application generally indicates an "or" relationship between the contextually associated objects.

In the embodiments of this application, the same reference signs denote the same components. For brevity, in different embodiments, detailed descriptions of the same components are not repeated. It should be understood that as shown in the accompanying drawings, sizes such as thickness, length, and width of various components and sizes such as thickness, length, and width of integrated devices in the embodiments of this application are merely for illustrative purposes and should not constitute any limitations on this application.

In this application, "a plurality of" means more than two (inclusive).

In this application, the battery cell may include a lithium-ion secondary battery, a lithium-ion primary battery, a lithium-sulfur battery, a sodium-lithium-ion battery, a sodium-ion battery, a magnesium-ion battery, or the like. This is not limited in the embodiments of this application. The battery cell may be cylindrical, flat, cuboid, or of other shapes. This is not limited in the embodiments of this application either. Battery cells are typically divided into three types by packaging method: cylindrical cell, prismatic cell, and pouch cell. The type of battery cell is not limited in the embodiments of this application either.

The battery mentioned in the embodiments of this application is a single physical module that includes one or more battery cells for providing a higher voltage and capacity. For example, the battery mentioned in this application may include a battery module, a battery pack, or the like. A battery typically includes a box configured to enclose one or more battery cells or battery modules. The box can prevent a liquid or another foreign matter from affecting charging or discharging of the battery cells.

The battery cell includes a housing, an electrode assembly, and an electrolyte. The housing is configured to accommodate the electrode assembly and the electrolyte. The electrode assembly includes a positive electrode plate, a negative electrode plate, and a separator. Working of the battery cell mainly relies on migration of metal ions between the positive electrode plate and the negative electrode plate.

In recent years, there has been a leap in the development of new energy vehicles. In the field of electric vehicles, traction batteries serve as an irreplaceable and crucial power source. A battery consists of a box and a plurality of battery cells accommodated in the box. As a core component of new energy vehicles, batteries have high requirements in terms of both safety and service life.

The inventors have found that in general traction batteries, to allow a battery to obtain sufficient power, a plurality of battery cells in a box of the battery are usually arranged in an array. However, during the continuous charging and discharging process, the battery cells generate a large amount of heat, causing the internal temperature of the battery to rise. A structure with a plurality of battery cells stacked exacerbates this phenomenon, severely affecting the use performance and service life of the battery, and can even lead to significant safety risks during use of the battery, which is detrimental to consumer safety. Therefore, in the related art, a water cooling plate is usually provided inside the battery and located on one side of the plurality of battery cells. A passage through which a cooling medium flows is formed in the water cooling plate, so as to cool the battery cells. However, due to the significant weight of the water cooling plate itself, after injection of a liquid coolant further increases the weight of the water cooling plate, resulting in a heavier battery with such water cooling plate. This reduces the overall energy density of the battery, leading to poor use performance of the battery and hindering its promotion and use.

Based on the above considerations, to solve the problem of poor use performance of batteries due to the heavy weight of existing batteries, the inventors have designed a thermal management component through in-depth research. The thermal management component is provided with a medium inlet, a medium outlet, and a medium flow channel. The medium flow channel is located inside the thermal management component, the medium flow channel communicates with the medium inlet and the medium outlet, and the medium flow channel is used to accommodate a fluid medium to regulate temperature of the battery. The thermal management component is internally provided with a cavity disconnected from both the medium inlet and the medium outlet.

In the thermal management component with such structure, the thermal management component is provided with the medium inlet, the medium outlet, the cavity, and the medium flow channel, and the medium flow channel communicates with both the medium inlet and the medium outlet and thus can accommodate the fluid medium to regulate the temperature of the battery, which can alleviate the phenomenon of sharp temperature rise inside the battery. The cavity is disconnected from both the medium inlet and the medium outlet, preventing the fluid medium from entering the cavity. This not only regulates the temperature of the battery but also reduces the weight of the thermal management component, achieving light weight of the thermal management component. In addition, during use, this can alleviate an increase in the weight of the thermal management component caused by the fluid medium entering the cavity, thereby effectively reducing the weight of the battery with such thermal management component, helping to increase the energy density of the battery, and improving the use performance of the battery.

The thermal management component disclosed in embodiments of this application may be used in, but is not limited to, vehicles, ships, aircraft, or other electric apparatus. A power supply system of such electric apparatus may include the thermal management system, battery, and other components disclosed in this application. This helps to reduce the overall weight of the battery, thereby improving the energy density and use performance of the battery.

An embodiment of this application provides an electric apparatus that uses a battery as a power source. The electric apparatus may include but is not limited to a mobile phone, a tablet, a laptop computer, an electric toy, an electric tool, an electric bicycle, an electric car, a ship, and a spacecraft. The electric toy may be a fixed or mobile electric toy, for example, a game console, an electric toy car, an electric toy ship, and an electric toy airplane. The spacecraft may include an airplane, a rocket, a space shuttle, a spaceship, and the like.

For ease of description, an electric apparatus according to an embodiment of this application being a vehicle 1000 is used as an example for description of the following embodiments.

Refer to FIG. 1. FIG. 1 is a schematic structural diagram of a vehicle 1000 according to some embodiments of this application. The vehicle 1000 may be a fossil fuel vehicle, a natural-gas vehicle, or a new energy vehicle, where the new energy vehicle may be a battery electric vehicle, a hybrid electric vehicle, a range-extended vehicle, or the like. The vehicle 1000 is provided with a battery 100 inside, where the battery 100 may be arranged at the bottom, front, or rear of the vehicle 1000. The battery 100 may be configured to supply power to the vehicle 1000. For example, the battery 100 may be used as an operational power supply for the vehicle 1000. The vehicle 1000 may further include a controller 200 and a motor 300, where the controller 200 is configured to control the battery 100 to supply power to the motor 300, for example, to satisfy power needs of start, navigation, and driving of the vehicle 1000.

In some embodiments of this application, the battery 100 can be used as not only the operational power source for the vehicle 1000 but also a driving power source for the vehicle 1000, replacing or partially replacing fossil fuel or natural gas to provide driving traction for the vehicle 1000.

Figure 2:
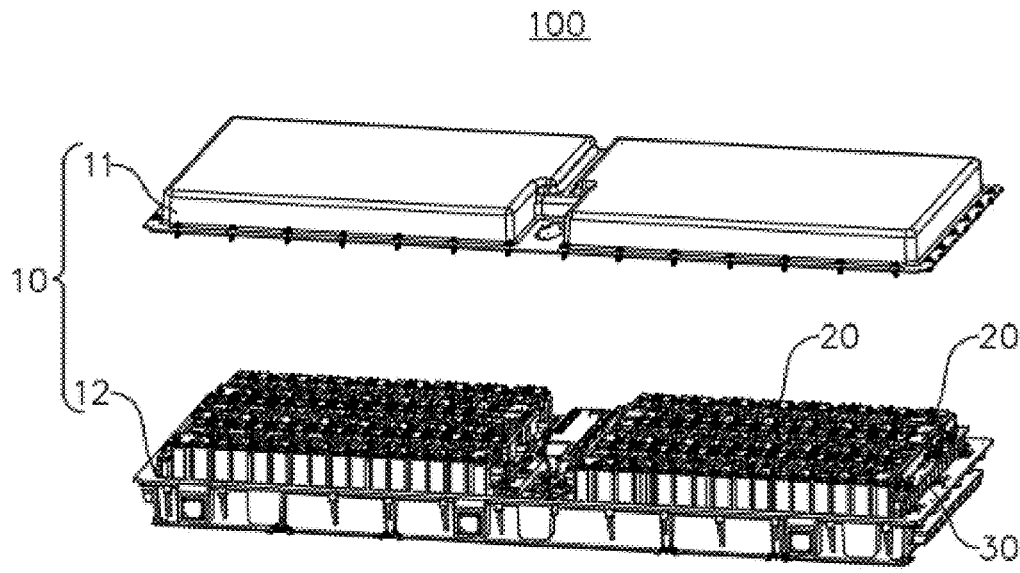
FIG. 2 is a structural exploded view of a battery according to some embodiments of this application.

Refer to FIG. 2. FIG. 2 is a structural exploded view of a battery 100 according to some embodiments of this application. The battery 100 may further include a box 10 and a plurality of battery cells 20, and the plurality of battery cells 20 are accommodated in the box 10. The box 10 is configured to provide an accommodating space for the battery cell 20. The box 10 may be a variety of structures. In some embodiments, the box 10 may include a first box body 11 and a second box body 12. The first box body 11 and the second box body 12 fit together so that the first box body 11 and the second box body 12 jointly define an accommodating space for accommodating the battery cell 20. The second box body 12 may be a hollow structure with one end open, and the first box body 11 may be a plate-shaped structure, where the first box body 11 covers the open side of the second box body 12 so that the first box body 11 and the second box body 12 jointly define the accommodating space. Alternatively, the first box body 11 and the second box body 12 may each be a hollow structure with one side open, and the open side of the first box body 11 is engaged with the open side of the second box body 12. Certainly, the box 10 formed by the first box body 11 and the second box body 12 may be of various shapes, for example, cylinder or cuboid.

In the battery 100, the plurality of battery cells 20 may be connected in series, parallel, or series-parallel, where being connected in series-parallel means a combination of series and parallel connections of the plurality of battery cells 20. The plurality of battery cells 20 may be directly connected in series, parallel, or series-parallel, and then an entirety of the plurality of battery cells 20 is accommodated in the box 10. Certainly, the battery 100 may alternatively be formed in a manner that a plurality of battery cells 20 are connected in series, parallel, or series-parallel first to form a battery module and then a plurality of battery modules are connected in series, parallel, or series-parallel to form an entirety which is accommodated in the box 10. The battery 100 may further include other structures. For example, the battery 100 may further include a busbar configured to implement electrical connection between the plurality of battery cells 20.

Optionally, the battery 100 may further include a thermal management system 30, where the thermal management system 30 is disposed inside the box 10, and the thermal management system 30 is used to manage temperature of the battery cells 20 so as to cool the battery cells 20.

Figure 3:
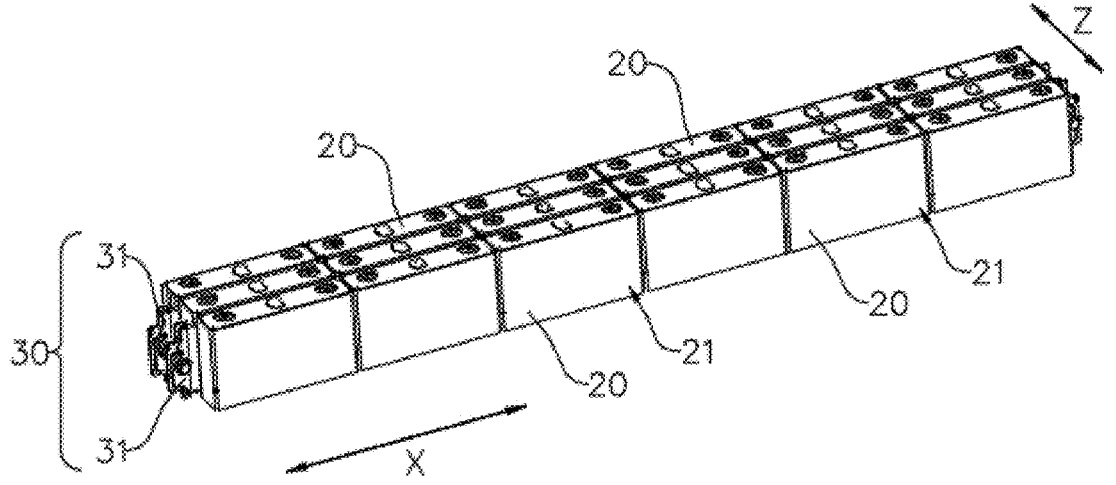
FIG. 3 is a schematic diagram of connection between a thermal management system and a battery cell according to some embodiments of this application.

Refer to FIG. 2 and further refer to FIG. 3. FIG. 3 is a schematic diagram of connection between a thermal management system 30 and battery cells 20 according to some embodiments of this application. The battery 100 includes multiple rows of battery cells 20. The multiple rows of battery cells 20 are arranged along a width direction of the battery cells 20. Each row of battery cells 20 includes a plurality of battery cells 20 arranged along a length direction of the battery cells 20.

Each battery cell 20 may be a secondary battery or a primary battery, or may be a lithium-sulfur battery, a sodium-ion battery, or a magnesium-ion battery, without being limited thereto. The battery cell 20 may be cylindrical, flat, cuboid, or of other shapes. For example, in FIG. 3, the battery cell 20 is cuboid in shape.

In some embodiments, the thermal management system 30 may include a plurality of thermal management components 31. Along the width direction of the battery cells 20, one thermal management component 31 is disposed between two adjacent rows of battery cells 20. The thermal management component 31 is configured to exchange heat with the battery cells 20 so as to manage the temperature of the battery cells 20.

Figure 4:
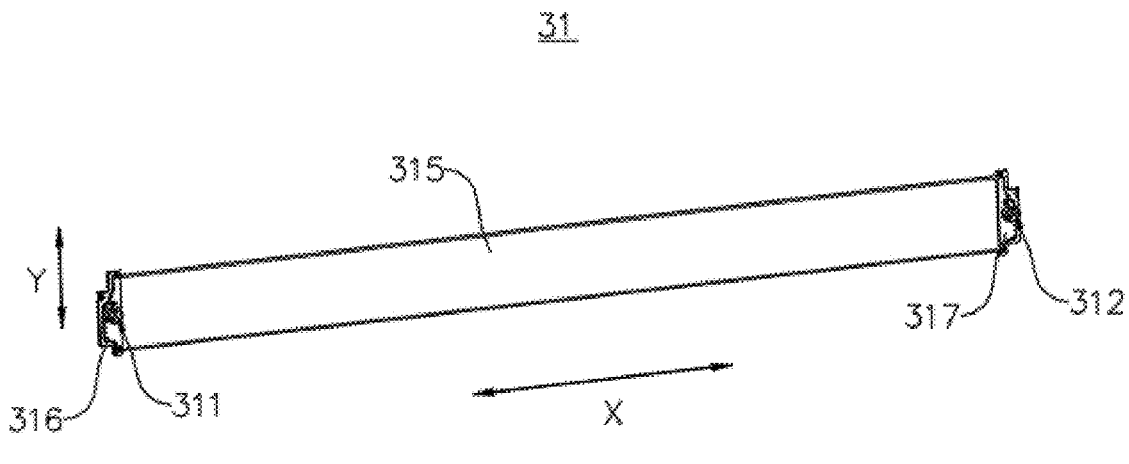
FIG. 4 is a schematic structural diagram of a thermal management component according to some embodiments of this application.

According to some embodiments of this application, referring to FIG. 3 and further referring to FIG. 4, FIG. 4 is a schematic structural diagram of a thermal management component 31 according to some embodiments of this application. This application provides a thermal management component 31, where the thermal management component 31 is provided with a medium inlet 311, a medium outlet 312, and a medium flow channel 313 (not shown in FIG. 4). The medium flow channel 313 is located inside the thermal management component 31, and the medium flow channel 313 communicates with the medium inlet 311 and the medium outlet 312. The medium flow channel 313 is used to accommodate a fluid medium to regulate temperature of the battery 100. The thermal management component 31 is internally provided with a cavity 314 (not shown in FIG. 4) disconnected from both the medium inlet 311 and the medium outlet 312.

The medium inlet 311 and the medium outlet 312 are respectively provided at two ends of the thermal management component 31. The medium flow channel 313 and the cavity 314 are both provided inside the thermal management component 31. The medium flow channel 313 communicates with the medium inlet 311 and the medium outlet 312, meaning that two ends of the medium flow channel 313 respectively communicate with the medium inlet 311 and the medium outlet 312, allowing the fluid medium to flow into or out of the medium flow channel 313. The cavity 314 is disconnected from both the medium inlet 311 and the medium outlet 312, meaning that the cavity 314 does not form a connection with the medium inlet 311 and the medium outlet 312, preventing the fluid medium from entering the cavity 314.

The medium flow channel 313 is used to accommodate the fluid medium, meaning that when flowing through the medium flow channel 313, the fluid medium can exchange heat with the inside of the battery 100 through the thermal management component 31, thereby achieving the function of the thermal management component 31 in managing the internal temperature of the battery 100. For example, the fluid medium may be a gas, such as air or hydrogen, or may be a liquid, such as water, a saline solution, or liquid nitrogen.

It should be noted that the cavity 314 provided inside the thermal management component 31 may be provided in one or in plurality, and similarly, the medium flow channel 313 provided inside the thermal management component 31 may be provided in one or in plurality. When the medium flow channel 313 is provided in plurality, each medium flow channel 313 communicates with the medium inlet 311 and the medium outlet 312, meaning that two ends of each of the plurality of medium flow channels 313 respectively communicate with the medium inlet 311 and the medium outlet 312. For example, in the embodiments of this application, a plurality of medium flow channels 313 and a plurality of cavities 314 are provided inside the thermal management component 31.

The thermal management component 31 is provided with the medium inlet 311, the medium outlet 312, the cavity 314, and the medium flow channel 313, and the medium flow channel 313 communicates with both the medium inlet 311 and the medium outlet 312 and thus can accommodate the fluid medium to regulate the temperature of the battery 100, which can alleviate the phenomenon of sharp temperature rise inside the battery 100. The cavity 314 is disconnected from both the medium inlet 311 and the medium outlet 312, preventing the fluid medium from entering the cavity 314. This not only regulates the temperature of the battery 100 but also reduces the weight of the thermal management component 31, achieving light weight of the thermal management component 31. In addition, during use, this can alleviate an increase in the weight of the thermal management component 31 caused by the fluid medium entering the cavity 314, thereby effectively reducing the weight of the battery 100 with such thermal management component 31, helping to increase the energy density of the battery 100, and improving the use performance of the battery 100.

Figure 5:
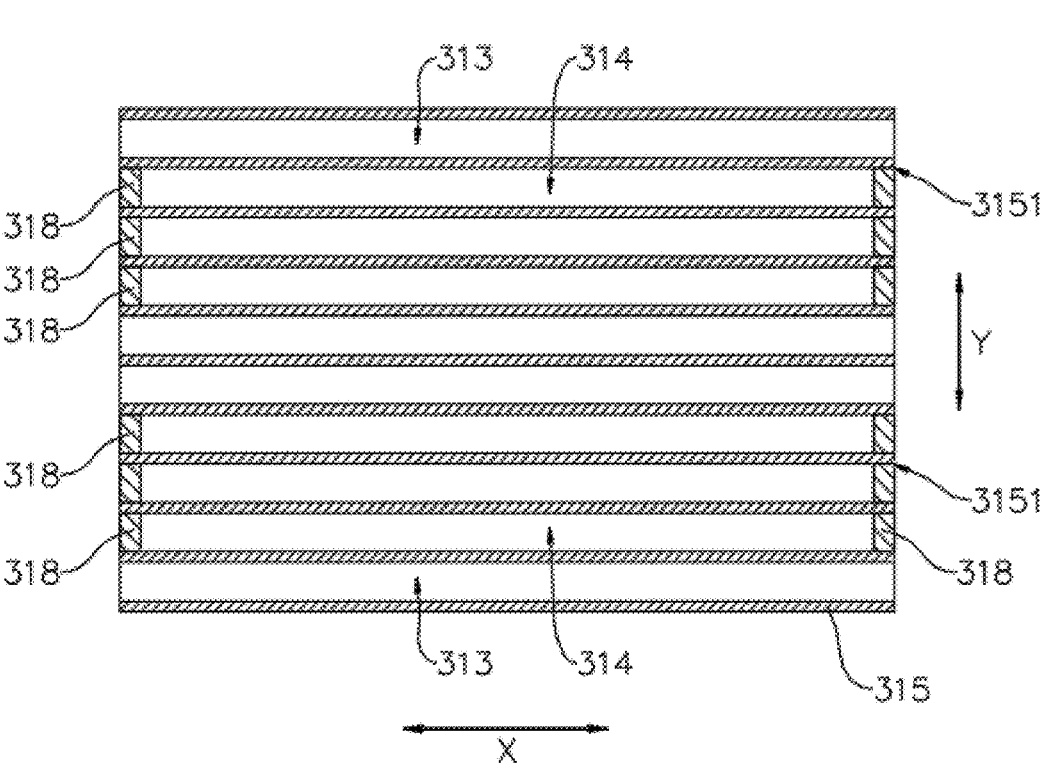
FIG. 5 is a cross-sectional view of a body portion of a thermal management component according to some embodiments of this application.

According to some embodiments of this application, referring to FIG. 4 and further referring to FIG. 5, FIG. 5 is a cross-sectional view of a body portion 315 of a thermal management component 31 according to some embodiments of this application. The thermal management component 31 includes a body portion 315, a first fluid collecting member 316, and a second fluid collecting member 317. The body portion 315 is provided with the medium flow channel 313 and the cavity 314. In a length direction X of the body portion, the first fluid collecting member 316 and the second fluid collecting member 317 are respectively disposed at two ends of the body portion 315, and the medium inlet 311 and the medium outlet 312 are respectively provided on the first fluid collecting member 316 and the second fluid collecting member 317.

The medium flow channel 313 and the cavity 314 are both provided inside the body portion 315. For example, in FIG. 5, the medium flow channel 313 and the cavity 314 both extend along the length direction X of the body portion, and two ends of the medium flow channel 313 respectively penetrate through the two ends of the body portion 315, allowing the medium flow channel 313 to communicate with the medium inlet 311 of the first fluid collecting member 316 and the medium outlet 312 of the second fluid collecting member 317.

It should be noted that the body portion 315, the first fluid collecting member 316, and the second fluid collecting member 317 may be of an integrated structure or a separate structure. When the body portion 315, the first fluid collecting member 316, and the second fluid collecting member 317 are of an integrated structure, the body portion 315, the first fluid collecting member 316, and the second fluid collecting member 317 may be made by casting or injection molding. When the body portion 315, the first fluid collecting member 316, and the second fluid collecting member 317 are of a separate structure, the first fluid collecting member 316 and the second fluid collecting member 317 may be connected to the two ends of the body portion 315 by bolting, clamping, or bonding.

The thermal management component 31 is provided with the body portion 315 and the first fluid collecting member 316 and second fluid collecting member 317 connected to the two ends of the body portion 315 in the length direction X of the body portion. The body portion 315 is provided with the medium flow channel 313 and the cavity 314, and the medium inlet 311 and the medium outlet 312 are respectively provided on the first fluid collecting member 316 and the second fluid collecting member 317, so that two ends of the medium flow channel 313 communicate with the medium inlet 311 and the medium outlet 312 respectively, and the cavity 314 does not communicate with the medium inlet 311 and the medium outlet 312, achieving light weight of the thermal management component 31. Such thermal management component 31 is simple in structure and easy to manufacture.

Figure 6:
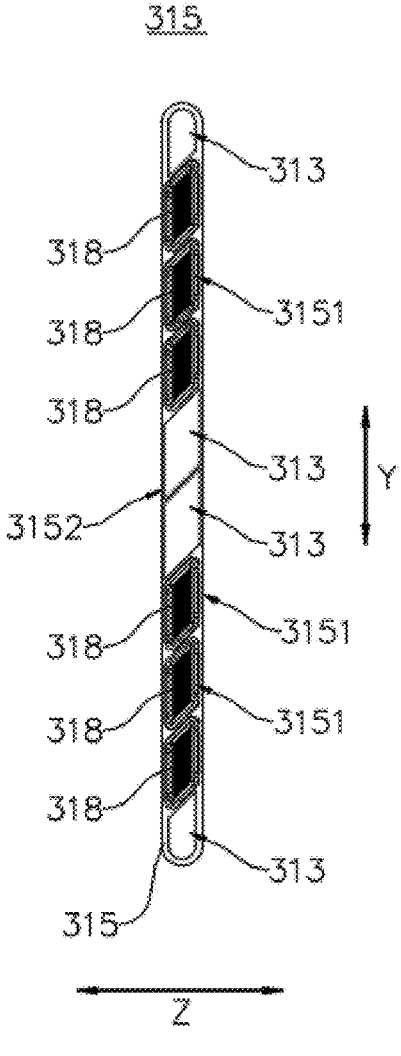
FIG. 6 is a sectional view of a body portion of a thermal management component according to some embodiments of this application.

According to some embodiments of this application, referring to FIG. 4 and FIG. 5 and further referring to FIG. 6, FIG. 6 is a sectional view of a body portion 315 of a thermal management component 31 according to some embodiments of this application. The body portion 315 is internally provided with a passage 3151, and the passage 3151 runs through the two ends of the body portion 315 in the length direction X of the body portion. The thermal management component 31 further includes a sealing member 318, where the sealing member 318 is connected to the body portion 315, and the sealing member 318 seals two ends of the passage 3151 to form the cavity 314.

In the length direction X of the body portion, the two ends of the passage 3151 running through the body portion 315 are each provided with the sealing member 318. The two ends of the passage 3151 are sealed by the sealing member 318 to form a sealed cavity 314, so that the cavity 314 is disconnected from both the medium inlet 311 and the medium outlet 312.

For example, the sealing member 318 may be a metal sheet, rubber plug, or silicone plug. During actual production, different sealing members 318 can be used according to the size of the passage 3151. For example, when the passage 3151 is large, a metal sheet can be welded to one end of the body portion 315 to seal the passage 3151, or a rubber plug or silicone plug can be used to seal the passage 3151. When the passage 3151 is small, a metal sheet is difficultly welded, so a rubber plug or silicone plug can be plugged in the passage 3151 to seal the passage 3151.

In some embodiments, referring to FIG. 5 and FIG. 6, the sealing member 318 is detachably connected to the body portion 315. The detachable connection of the sealing member 318 to the body portion 315 allows for quick removal and replacement of the sealing member 318. This facilitates sealing of different passages 3151 according to actual needs during use, meeting various use requirements. In addition, this allows for maintenance and replacement of the sealing member 318, helping to prolong the service life of the thermal management component 31.

For example, the sealing member 318 is clamped to one end of the passage 3151 to seal the passage 3151. Certainly, in other embodiments, the sealing member 318 may alternatively be detachably connected to the body portion 315 by bolting or snapping.

Figure 7:
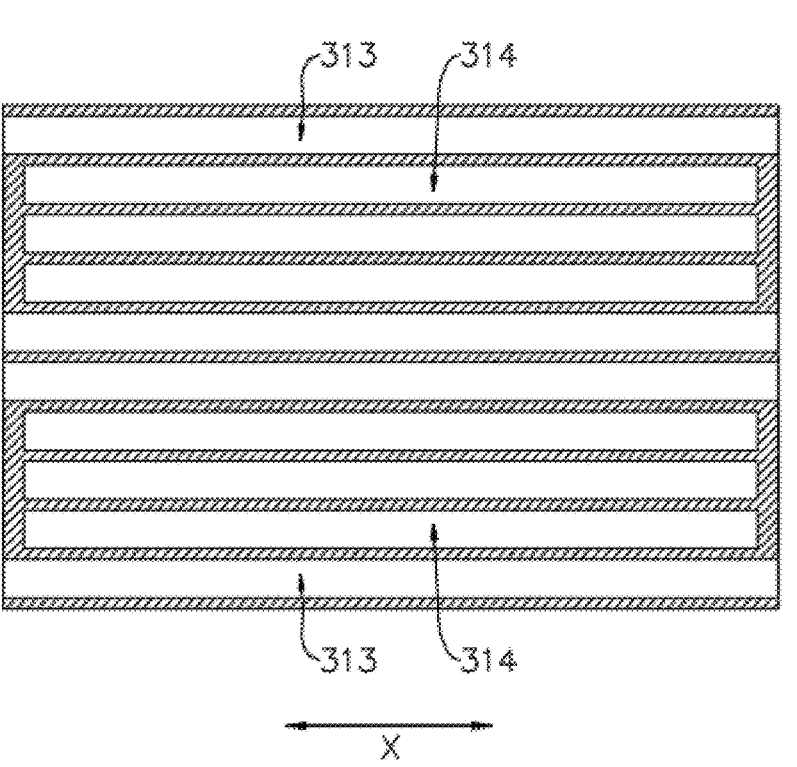
FIG. 7 is a cross-sectional view of a body portion of a thermal management component according to some other embodiments of this application.

It should be noted that in FIG. 6, the cavity 314 is a sealed structure formed by sealing the passage 3151 inside the body portion 315 with the sealing member 318. In other embodiments, referring to FIG. 7, FIG. 7 is a cross-sectional view of a body portion 315 of a thermal management component 31 according to some other embodiments of this application. The cavity 314 may alternatively be a structure integrally formed with the body portion 315, meaning that the cavity 314 is a structure provided with a cavity inside and formed by casting or stamping the body portion 315, that is, the sealing member 318 and the body portion 315 are of an integrated structure.

The passage 3151 running through the two ends of the body portion 315 in the length direction X of the body portion is formed in the body portion 315 of the thermal management component 31, and the sealing member 318 is disposed on the body portion 315 so that the sealing member 318 seals the two ends of the passage 3151 to form the cavity 314 disconnected from both the medium inlet 311 and the medium outlet 312. This structure is simple and easy to manufacture and process, and different passages 3151 can be sealed according to actual needs, expanding the application range of the thermal management component 31.

According to some embodiments of this application, referring to FIG. 4 and FIG. 5, the first fluid collecting member 316 is internally provided with a first chamber communicating with the medium inlet 311, and the second fluid collecting member 317 is internally provided with a second chamber communicating with the medium outlet 312. The medium flow channel 313 runs through the two ends of the body portion 315 in the length direction X of the body portion to communicate with the first chamber and the second chamber.

The first fluid collecting member 316 is internally provided with the first chamber communicating with the medium inlet 311, meaning that the first chamber is formed in the first fluid collecting member 316, and the medium inlet 311 runs through the chamber wall of the first chamber, so that when the first fluid collecting member 316 is installed at one end of the body portion 315, the medium flow channel 313 running through one end of the body portion 315 can communicate with the first chamber in the first fluid collecting member 316, allowing a plurality of medium flow channels 313 to communicate with the first chamber of the first fluid collecting member 316, thereby achieving communication between the plurality of medium flow channels 313 and the medium inlet 311.

Similarly, the second fluid collecting member 317 is internally provided with the second chamber communicating with the medium outlet 312, meaning that the second chamber is formed in the second fluid collecting member 317, and the medium outlet 312 runs through the chamber wall of the second chamber, so that when the second fluid collecting member 317 is installed at one end of the body portion 315, the medium flow channel 313 running through one end of the body portion 315 can communicate with the second chamber in the second fluid collecting member 317, allowing a plurality of medium flow channels 313 to communicate with the second chamber of the second fluid collecting member 317, thereby achieving communication between the plurality of medium flow channels 313 and the medium outlet 312.

It should be noted that the cavity 314 does not communicate with both the first chamber of the first fluid collecting member 316 and the second chamber of the second fluid collecting member 317, thereby allowing the cavity 314 to be disconnected from both the medium inlet 311 and the medium outlet 312.

The first fluid collecting member 316 is provided with the first chamber communicating with the medium inlet 311, and the second fluid collecting member 317 is provided with the second chamber communicating with the medium outlet 312. This allows the medium flow channel 313 to communicate with both the first chamber and the second chamber after running through the two ends of the body portion 315, achieving communication between the medium flow channel 313 and both the medium inlet 311 and the medium outlet 312. This allows for simultaneous injection of the fluid medium into a plurality of medium flow channels 313 through the medium inlet 311 and the medium outlet 312 during use, improving the use efficiency.

According to some embodiments of this application, referring to FIG. 5 and FIG. 6, the cavity 314 and the medium flow channel 313 both extend along the length direction X of the body portion and are arranged along a width direction Y of the body portion.

The thermal management component 31 is provided with a plurality of medium flow channels 313 and a plurality of cavities 314, where the cavities 314 and the medium flow channels 313 all extend along the length direction X of the body portion, and the plurality of cavities 314 and the plurality of medium flow channels 313 are arranged along the width direction Y of the body portion. The arrangement of the plurality of cavities 314 and the plurality of medium flow channels 313 may vary. For example, the cavities 314 and medium flow channels 313 may be arranged alternately; alternatively, the plurality of cavities 314 may be located on one side of the plurality of medium flow channels 313 along the width direction Y of the body portion, or the plurality of cavities 314 may be provided at a middle position of the body portion 315 along the width direction Y of the body portion, where medium flow channels 313 are provided on two sides of the plurality of cavities 314. For example, in FIG. 5, in the width direction Y of the body portion, two medium flow channels 313 are provided at the middle position of the body portion 315, three cavities 314 are respectively provided on two sides of the two medium flow channels 313, and the two ends of the body portion 315 are each provided with one medium flow channel 313.

The cavity 314 and the medium flow channel 313 both extend along the length direction X of the body portion and are arranged along the width direction Y of the body portion, facilitating the processing and manufacturing of the cavity 314 and the medium flow channel 313 and facilitates the optimization of the arrangement position of the medium flow channel 313, thereby helping to improve the capability of the thermal management component 31 in regulating the temperature of the battery 100.

According to some embodiments of this application, referring to FIG. 5 and FIG. 6, in the width direction Y of the body portion, the medium flow channel 313 is provided at the middle position of the body portion 315.

The medium flow channel 313 is provided at the middle position of the body portion 315. If there is one medium flow channel 313, the medium flow channel 313 is positioned at the middle position of the body portion 315. If there are a plurality of medium flow channels 313, at least some of the plurality of medium flow channels 313 are positioned at the middle position of the body portion 315 in the width direction Y of the body portion. For example, in FIG. 5 and FIG. 6, in the width direction Y of the body portion, two medium flow channels 313 are provided at the middle position of the body portion 315. Certainly, in other embodiments, in the width direction Y of the body portion, one, three, or four medium flow channels 313 may alternatively be provided at the middle position of the body portion 315.

The medium flow channel 313 is provided at the middle position of the body portion 315 in the width direction of the body portion 315, allowing for heat exchange in positions where the internal heat of the battery 100 is more concentrated, thereby helping to improve the thermal management performance of the thermal management component 31 for the battery 100.

Figure 8:
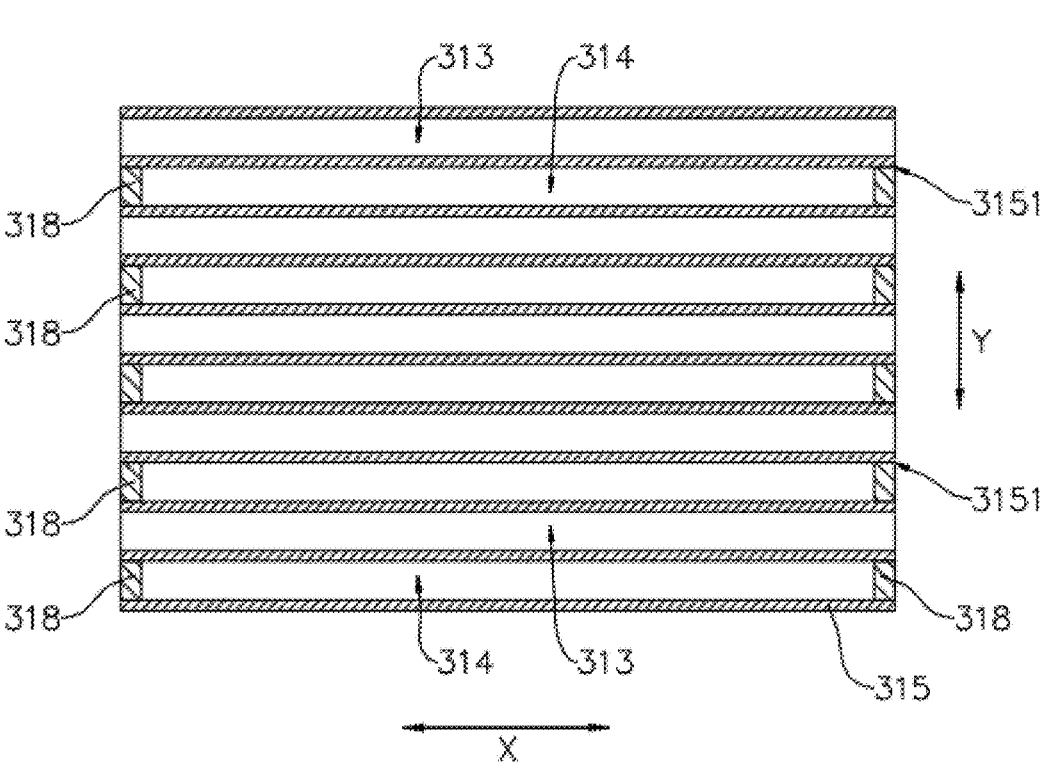
FIG. 8 is a cross-sectional view of a body portion of a thermal management component according to yet some other embodiments of this application.

According to some embodiments of this application, referring to FIG. 8, FIG. 8 is a cross-sectional view of a body portion 315 of a thermal management component 31 according to yet some other embodiments of this application. The thermal management component 31 is provided with a plurality of medium flow channels 313 and a plurality of cavities 314, and along the width direction Y of the body portion, the cavities 314 and the medium flow channels 313 are arranged alternately.

The cavities 314 and medium flow channels 313 are arranged alternately, meaning that the cavities 314 and medium flow channels 313 are arranged alternately along the width direction Y of the body portion. In other words, along the width direction Y of the body portion, a cavity 314 is provided between two adjacent medium flow channels 313, and a medium flow channel 313 is provided between two adjacent cavities 314.

The cavities 314 and medium flow channels 313 are arranged alternately along the width direction Y of the body portion, meaning that there are a plurality of cavities 314 and a plurality of medium flow channels 313, and the cavities 314 and the medium flow channels 313 are arranged alternately. This achieves a dispersed arrangement of the medium flow channels 313 along the width direction Y of the body portion, effectively reducing the phenomenon of unbalanced heat exchange capacity of the thermal management component 31 caused by concentrated medium flow channels 313, thereby helping to improve the use performance of the thermal management component 31.

According to some embodiments of this application, referring to FIG. 6, in a thickness direction Z of the body portion, the body portion 315 has two opposite side surfaces 3152. The area of one side surface 3152 is denoted as $S_1$, and the total area of projections of the medium flow channels 313 on the side surface 3152 is denoted as $S_2$, satisfying $S_2/S_1 \geq 0.2$.

The area of one side surface 3152 is denoted as $S_1$, and the total area of the projections of the medium flow channels 313 on the side surface 3152 is denoted as $S_2$, satisfying $S_2/S_1 \geq 0.2$, meaning that the total area occupied by a plurality of medium flow channels 313 on the side surface 3152 of the body portion 315 is greater than or equal to 20%.

The area occupied by the plurality of medium flow channels 313 on the side surface 3152 of the body portion 315 is greater than or equal to 20%, reducing the phenomenon of low heat exchange capacity caused by an excessively small area occupied by the medium flow channels 313, thereby ensuring the heat exchange performance of the thermal management component 31.

According to some embodiments of this application, referring to FIG. 3 and FIG. 4, an embodiment of this application further provides a thermal management system 30, where the thermal management system 30 includes a plurality of thermal management components 31 in any one of the foregoing solutions.

The medium flow channels 313 of the plurality of thermal management components 31 may be connected in series with each other, meaning that a medium inlet 311 of one thermal management component 31 communicates with a medium outlet 312 of another thermal management component 31. Certainly, the medium flow channels 313 of the plurality of thermal management components 31 may alternatively be connected in parallel with each other, meaning that the medium inlets 311 of the plurality of thermal management components 31 communicate with each other, and the medium outlets 312 of the plurality of thermal management components 31 communicate with each other.

The thermal management system 30 is provided with the plurality of thermal management components 31, helping to improve the thermal management capability of the thermal management system 30 for a battery 100 in the battery 100 with such thermal management system 30, thereby reducing the safety risks caused by internal temperature rise of the battery 100.

According to some embodiments of this application, referring to FIG. 3 and FIG. 4, a medium outlet 312 of one thermal management component 31 communicates with a medium inlet 311 of another thermal management component 31.

The medium outlet 312 of one thermal management component 31 may communicate with the medium inlet 311 of another thermal management component 31 through various structures. The medium outlet 312 of one thermal management component 31 may be connected to the medium inlet 311 of another thermal management component 31 or communicate with the medium inlet 311 of another thermal management component 31 through other components such as connecting pipes, to achieve a series connection structure of the plurality of thermal management components 31.

In the plurality of thermal management components 31, the medium outlet 312 of one thermal management component 31 communicates with the medium inlet 311 of another thermal management component 31, achieving a series connection structure of the plurality of thermal management components 31, thereby facilitating assembly and processing, and allowing for injection of the fluid medium into the medium flow channels 313 of the plurality of thermal management components 31 during use.

According to some embodiments of this application, the thermal management component 31 is provided with a plurality of medium flow channels 313. Along the flow direction of the fluid medium in the medium flow channels 313 of the plurality of thermal management components 31, in two adjacent thermal management components 31, the number of the medium flow channels 313 in a downstream thermal management component 31 is greater than the number of the medium flow channels 313 in an upstream thermal management component 31.

The flow direction of the fluid medium in the medium flow channels 313 of the plurality of thermal management components 31 is a direction along which the fluid medium flows through the medium flow channels 313 of the plurality of thermal management components 31.

In the two adjacent thermal management components 31, the number of the medium flow channels 313 in the downstream thermal management component 31 is greater than the number of the medium flow channels 313 in the upstream thermal management component 31, meaning that along the flow direction of the fluid medium, in the two adjacent thermal management components 31, the thermal management component 31 through which the fluid medium flows first is the upstream thermal management component 31, and the thermal management component 31 through which the fluid medium flows later is the downstream thermal management component 31. In other words, the fluid medium flows from the medium flow channels 313 of the upstream thermal management component 31 to the medium flow channels 313 of the downstream thermal management component 31.

The number of the medium flow channels 313 in the downstream thermal management component 31 is greater than the number of the medium flow channels 313 in the upstream thermal management component 31, helping to improve the heat exchange capacity of the downstream thermal management component 31, and ensuring balanced heat exchange capacities of the plurality of thermal management components 31 of the thermal management system 30, thereby improving the overall thermal management capability of the thermal management system 30, and effectively alleviating the phenomenon of local temperature rise inside the battery 100.

In some embodiments, the medium inlets 311 of the plurality of thermal management components 31 communicate with each other, and the medium outlets 312 of the plurality of thermal management components 31 communicate with each other.

The medium inlets 311 of the plurality of thermal management components 31 may directly communicate with each other or communicate with each other through other components such as connecting pipes. Similarly, the medium outlets 312 of the plurality of thermal management components 31 may communicate with each other in the same way, achieving a parallel connection structure of the plurality of thermal management components 31.

The medium inlets 311 of the plurality of thermal management components 31 communicate with each other, and the medium outlets 312 of the plurality of thermal management components 31 communicate with each other, achieving a parallel connection structure of the plurality of thermal management components 31. This allows for simultaneous injection of the fluid medium into the medium flow channels 313 of the plurality of thermal management components 31. In addition, this can ensure balanced heat exchange capacity of each thermal management component 31, thereby effectively alleviating the phenomenon of local temperature rise inside the battery 100.

According to some embodiments of this application, referring to FIG. 2, an embodiment of this application further provides a battery 100. The battery 100 includes a box 10, a plurality of battery cells 20, and the thermal management system 30 in any one of the foregoing solutions. The plurality of battery cells 20 are accommodated in the box 10. The thermal management system 30 is disposed inside the box 10, and the thermal management system 30 is used to regulate temperature of the plurality of battery cells 20.

For example, in FIG. 2 and FIG. 3, the battery cells 20 are cuboid in shape. The plurality of battery cells 20 are arranged in rows, where the battery 100 includes multiple rows of battery cells 20, and the multiple rows of battery cells 20 are arranged along a width direction of the battery cells 20. Each row of battery cells 20 includes a plurality of battery cells 20 arranged along a length direction of the battery cells 20.

According to some embodiments of this application, referring to FIG. 3 and FIG. 4, the battery cell 20 has a first side surface 21, the first side surface 21 is a surface with the largest area of outer surfaces of the battery cell 20, and the first side surface 21 abuts against the thermal management component 31.

The first side surface 21 abutting against the thermal management component 31 may mean that the first side surface 21 directly abuts against the thermal management component 31. In other words, the surface with the largest area of the outer surfaces of the battery cell 20 is directly attached to the thermal management component 31. Certainly, in some embodiments, the first side surface 21 may alternatively indirectly abut against the thermal management component 31, meaning that the surface with the largest area of the outer surfaces of the battery cell 20 is attached to the thermal management component 31 through a thermal conductive element such as a thermal conductive adhesive.

It should be noted that the battery cell 20 is cuboid in structure, and the first side surface 21 is the surface with the largest area of the outer surfaces of the battery cell 20, meaning that the first side surface 21 is an outer surface of one side of the battery cell 20 in the width direction of the battery cell 20. In other words, the thermal management component 31 of the thermal management system 30 is disposed between two adjacent rows of battery cells 20 in the width direction of the battery cell 20, and the body portion 315 of the thermal management component 31 abuts against the first side surface 21 of the battery cell 20, achieving heat exchange between the battery cell 20 and the thermal management component 31.

The length direction X of the body portion is consistent with the length direction of the battery cell 20, and the thickness direction Z of the body portion is consistent with the width direction of the battery cell 20.

The thermal management component 31 of the thermal management system 30 abuts against the first side surface 21 of the battery cell 20, meaning that the thermal management component 31 of the thermal management system 30 is disposed on a side with the largest surface area of the battery cell 20, ensuring a sufficient heat exchange area between the battery cell 20 and the thermal management component 31, and helping to improve the thermal management capability of the thermal management component 31 for the battery cell 20, thereby effectively reducing the safety risks caused by temperature rise during the use of the battery 100.

According to some embodiments of this application, an embodiment of this application further provides an electric apparatus. The electric apparatus includes the battery 100 in any one of the foregoing solutions, and the battery 100 is used to supply electrical energy to the electric apparatus.

The electric apparatus may be any one of the foregoing devices or systems using the battery 100.

According to some embodiments of this application, referring to FIG. 3 to FIG. 6, this application provides a thermal management component 31. The thermal management component 31 includes a body portion 315, a first fluid collecting member 316, a second fluid collecting member 317, and a sealing member 318. The body portion 315 is internally provided with a medium flow channel 313 and a passage 3151. In a length direction X of the body portion, the first fluid collecting member 316 and the second fluid collecting member 317 are respectively disposed at two ends of the body portion 315. A medium inlet 311 and a medium outlet 312 are respectively provided on the first fluid collecting member 316 and the second fluid collecting member 317. The medium flow channel 313 communicates with both the medium inlet 311 and the medium outlet 312. The sealing member 318 is connected to the body portion 315 and the sealing member 318 seals two ends of the passage 3151 to form a cavity 314, where the cavity 314 is disconnected from both the medium inlet 311 and the medium outlet 312. The first fluid collecting member 316 is internally provided with a first chamber communicating with the medium inlet 311, and the second fluid collecting member 317 is internally provided with a second chamber communicating with the medium outlet 312. The medium flow channel 313 runs through the two ends of the body portion 315 in the length direction X of the body portion to communicate with the first chamber and the second chamber. The cavity 314 and the medium flow channel 313 both extend along the length direction X of the body portion and are arranged along a width direction Y of the body portion; and in the width direction Y of the body portion, the medium flow channel 313 is provided at a middle position of the body portion 315.

It should be noted that, without conflict, the embodiments and features in the embodiments in this application may be combined with each other.

The foregoing descriptions are merely some embodiments of this application which are not intended to limit this application. Persons skilled in the art understand that this application may have various modifications and variations. Any modifications, equivalent replacements, and improvements made without departing from the spirit and principle of this application shall fall within the protection scope of this application.

What is claimed is:

1. A thermal management component, provided with a medium inlet, a medium outlet, and a body portion provided with a medium flow channel and a cavity; wherein the medium flow channel is located inside the thermal management component, the medium flow channel communicates with the medium inlet and the medium outlet, and the medium flow channel is configured to accommodate a fluid medium;

the thermal management component is internally provided with the cavity disconnected from both the medium inlet and the medium outlet;

the cavity and the medium flow channel both extend along a length direction of the body portion and are arranged side by side along a width direction of the body portion, and the width direction is perpendicular to the length direction;

along a thickness direction of the body portion, a top surface of the medium flow channel is coplanar with a top surface of the cavity, a bottom surface of the medium flow channel is coplanar with a bottom surface of the cavity, the thickness direction is perpendicular to the length direction and the width direction, the top surface of the medium flow channel, the top surface of the cavity, the bottom surface of the medium flow channel, and the bottom surface of the cavity are all parts of sidewalls of the thermal management component; and two ends of the medium flow channel in the length direction are opened, and two ends of the cavity in the length direction are sealed by a sealing member.

2. The thermal management component according to claim 1, further comprising:

a first fluid collecting member and a second fluid collecting member, wherein in the length direction of the body portion, the first fluid collecting member and the second fluid collecting member are respectively disposed at two ends of the body portion, and the medium inlet and the medium outlet are respectively provided on the first fluid collecting member and the second fluid collecting member.

3. The thermal management component according to claim 2, wherein a first chamber communicating with the medium inlet is formed in the first fluid collecting member, a second chamber communicating with the medium outlet is formed in the second fluid collecting member, and the medium flow channel runs through the two ends of the body portion in the length direction of the body portion to communicate with the first chamber and the second chamber.

4. The thermal management component according to claim 1, wherein:

the body portion is internally provided with a passage, and the passage runs through the two ends of the body portion in the length direction of the body portion.

5. The thermal management component according to claim 1, wherein the sealing member is detachably connected to the body portion.

6. The thermal management component according to claim 1, wherein in the width direction of the body portion, the medium flow channel is provided at a middle position of the body portion.

7. The thermal management component according to claim 1, wherein the medium flow channel is one of a plurality of medium flow channels provided at the thermal management component, the cavity is one of a plurality of cavities provided in the thermal management component, and along the width direction of the body portion, the plurality of cavities and the plurality of medium flow channels are arranged alternately.

8. The thermal management component according to claim 1, wherein in the thickness direction of the body portion, the body portion has two opposite side surfaces, and area $S_1$ of one of the side surfaces and total area $S_2$ of projection of the medium flow channel on the side surface satisfy $S_2/S_1 \geq 0.2$.

9. The thermal management component according to claim 1, wherein the cavity includes two sidewalls connected to the top surface of the cavity and the bottom surface of the cavity, the two sidewalls of the cavity are parallel with each other, and the two sidewalls of the cavity are not perpendicular to the width direction.

10. A thermal management system, comprising a plurality of thermal management components each according to claim 1.

11. The thermal management system according to claim 10, wherein a medium outlet of one thermal management component communicates with a medium inlet of another thermal management component.

12. The thermal management system according to claim 11, wherein at least one of the thermal management components is provided with a plurality of medium flow channels, and along a flow direction of the fluid medium in the medium flow channels of the plurality of thermal management components, in two adjacent ones of the thermal management components, the number of the medium flow channels in a downstream thermal management component is greater than the number of the medium flow channels in an upstream thermal management component.

13. The thermal management system according to claim 10, wherein the medium inlets of the plurality of thermal management components communicate with each other, and the medium outlets of the plurality of thermal management components communicate with each other.

14. A battery, comprising:

a box;

a plurality of battery cells accommodated in the box; and the thermal management system according to claim 10, wherein the thermal management system is disposed in the box, and the thermal management system is configured to regulate temperature of the plurality of battery cells.

15. The battery according to claim 14, wherein the battery cell has a first side surface, the first side surface is a surface with the largest area of outer surfaces of the battery cell, and the first side surface abuts against the thermal management component.

16. An electric apparatus, comprising the battery according to claim 14, wherein the battery is configured to supply electrical energy.

17. A thermal management component, provided with a medium inlet, a medium outlet, a body portion provided with a medium flow channel and a cavity, a first fluid collecting member, and a second fluid collecting member; wherein the medium flow channel is located inside the thermal management component, the medium flow channel communicates with the medium inlet and the medium outlet, and the medium flow channel is configured to accommodate a fluid medium;

the thermal management component is internally provided with the cavity disconnected from both the medium inlet and the medium outlet;

in a length direction of the body portion, the first fluid collecting member and the second fluid collecting member are respectively disposed at two ends of the body portion, and the medium inlet and the medium outlet are respectively provided on the first fluid collecting member and the second fluid collecting member;

along a thickness direction of the body portion, a top surface of the medium flow channel is coplanar with a top surface of the cavity, a bottom surface of the medium flow channel is coplanar with a bottom surface of the cavity, the thickness direction is perpendicular to the length direction, the top surface of the medium flow channel, the top surface of the cavity, the bottom surface of the medium flow channel, and the bottom surface of the cavity are all parts of sidewalls of the thermal management component; and two ends of the medium flow channel in the length direction are opened, and two ends of the cavity in the length direction are sealed by a sealing member.

18. A thermal management component, provided with a medium inlet, a medium outlet, and a body portion; wherein the body portion comprises a plurality of medium flow channels and a plurality of cavities stacked in a width direction of the body portion, and at least one of the plurality of medium flow channels is sandwiched by two of the plurality of cavities in the width direction of the body portion;

the plurality of medium flow channels are located inside the thermal management component, each of the plurality of medium flow channels communicates with the medium inlet and the medium outlet, and is configured to accommodate a fluid medium;

the thermal management component is internally provided with the plurality of cavities each disconnected from both the medium inlet and the medium outlet;

the plurality of cavities and the plurality of medium flow channels extend along a length direction of the body portion and are arranged side by side along a width direction of the body portion, and the width direction is perpendicular to the length direction;

along a thickness direction of the body portion, top surfaces of the plurality of medium flow channels are coplanar with top surfaces of the plurality of cavities, bottom surfaces of the plurality of medium flow channels are coplanar with bottom surfaces of the plurality of cavities, the thickness direction is perpendicular to the length direction and the width direction, the top surfaces of the plurality of medium flow channels, the top surfaces of the plurality of cavities, the bottom surfaces of the plurality of medium flow channels, and the bottom surfaces of the plurality of cavities are all parts of sidewalls of the thermal management component; and two ends of each of the plurality of medium flow channels in the length direction are opened, and two ends of each of the plurality of cavities in the length direction are sealed by a sealing member.

* * * * *